(12) United States Patent
Grabs et al.

(10) Patent No.: US 8,413,169 B2
(45) Date of Patent: Apr. 2, 2013

(54) TIME-BASED EVENT PROCESSING USING PUNCTUATION EVENTS

(75) Inventors: Torsten W. Grabs, Seattle, WA (US); Jonathan Goldstein, Kirkland, WA (US); Beysim Sezgin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 12/603,445

(22) Filed: Oct. 21, 2009

(65) Prior Publication Data

US 2011/0093866 A1    Apr. 21, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl. ..................................... 719/318
(58) Field of Classification Search ................. 719/318; 707/104.1
See application file for complete search history.

(56) References Cited

U.S. PATENT DOCUMENTS

| | | |
|---|---|---|
| 5,321,837 A | 6/1994 | Daniel et al. |
| 5,528,516 A | 6/1996 | Yemini et al. |
| 5,546,570 A | 8/1996 | McPherson et al. |
| 5,691,917 A | 11/1997 | Harrison |
| 5,765,037 A | 6/1998 | Morrison et al. |
| 5,809,235 A | 9/1998 | Sharma et al. |
| 6,145,009 A | 11/2000 | Miyazawa et al. |
| 6,236,998 B1 | 5/2001 | Lehtinen |
| 6,253,313 B1 | 6/2001 | Morrison et al. |
| 6,327,587 B1 | 12/2001 | Forster |
| 6,336,139 B1 | 1/2002 | Feridun et al. |
| 6,449,618 B1 | 9/2002 | Blott et al. |
| 6,604,102 B2 | 8/2003 | Klein et al. |
| 6,629,106 B1 | 9/2003 | Narayanaswamy et al. |
| 6,681,230 B1 | 1/2004 | Blott et al. |
| 6,920,468 B1 | 7/2005 | Cousins et al. |
| 6,925,631 B2 | 8/2005 | Golden |
| 7,065,561 B2 | 6/2006 | Fry et al. |
| 7,310,638 B1 | 12/2007 | Blair |

(Continued)

FOREIGN PATENT DOCUMENTS

WO    2007/035452 A1    3/2007

OTHER PUBLICATIONS

"Jiang, et al", "Estreams: Towards an Integrated Model for Event and Stream Processing", retrieved at <<http://ariana.uta.edu/research/Publications/Downloads/CSE-2004-3.pdf>>, Jul. 1, 2004. pp. 25.

(Continued)

*Primary Examiner* — Diem Cao
(74) *Attorney, Agent, or Firm* — Merchant & Gould P.C.

(57) ABSTRACT

Methods, systems, and computer-readable media are disclosed for time-based event processing using punctuation events. A particular method includes receiving a first event object comprising a first validity start time and a first validity end time, where the first validity end time is initially undefined. A punctuation object is received after the first event object. The punctuation event object has a punctuation timestamp indicating a time subsequent to the first validity start time. The punctuation event object indicates that event objects to be received at the computer system after the punctuation event object have validity start times later than the time indicated by the punctuation timestamp. The method includes setting the first validity end time to a value later than or equal to the time indicated by the punctuation timestamp.

20 Claims, 5 Drawing Sheets

U.S. PATENT DOCUMENTS

| | | | |
|---|---|---|---|
| 7,349,675 | B2 | 3/2008 | Karr et al. |
| 7,349,925 | B2 | 3/2008 | Cherkauer et al. |
| 7,457,728 | B2 | 11/2008 | Chen et al. |
| 7,523,190 | B1 | 4/2009 | Bickerstaff et al. |
| 7,702,689 | B2 | 4/2010 | Forstmann et al. |
| 7,840,592 | B2 | 11/2010 | Muras |
| 2002/0083049 | A1 | 6/2002 | Forster et al. |
| 2003/0163465 | A1 | 8/2003 | Morrill |
| 2004/0068428 | A1 | 4/2004 | Mitchell |
| 2004/0111396 | A1 | 6/2004 | Musayev et al. |
| 2004/0172599 | A1 | 9/2004 | Calahan |
| 2004/0205082 | A1 | 10/2004 | Fontoura et al. |
| 2005/0055631 | A1 | 3/2005 | Scardina et al. |
| 2005/0138081 | A1 | 6/2005 | Alshab et al. |
| 2005/0165724 | A1 | 7/2005 | West |
| 2005/0182758 | A1 | 8/2005 | Seitz et al. |
| 2006/0069942 | A1 | 3/2006 | Brasilerio |
| 2006/0074741 | A1 | 4/2006 | Orumchian et al. |
| 2006/0100969 | A1 | 5/2006 | Wang et al. |
| 2006/0123119 | A1 | 6/2006 | Hill et al. |
| 2006/0136448 | A1 | 6/2006 | Cialini et al. |
| 2006/0149849 | A1 | 7/2006 | Raz |
| 2006/0161523 | A1 | 7/2006 | Dettinger et al. |
| 2006/0161528 | A1 | 7/2006 | Dettinger et al. |
| 2006/0230071 | A1 | 10/2006 | Kass et al. |
| 2006/0248182 | A1 | 11/2006 | Glassco et al. |
| 2006/0282695 | A1 | 12/2006 | Mital et al. |
| 2007/0043856 | A1 | 2/2007 | Morris et al. |
| 2007/0118545 | A1 | 5/2007 | Chandrasekharan et al. |
| 2007/0136239 | A1 | 6/2007 | Lee et al. |
| 2007/0168990 | A1 | 7/2007 | Alshab et al. |
| 2007/0237410 | A1 | 10/2007 | Cormode et al. |
| 2007/0255529 | A1 | 11/2007 | Biazetti et al. |
| 2007/0294217 | A1 | 12/2007 | Chen et al. |
| 2008/0016095 | A1 | 1/2008 | Bhatnagar et al. |
| 2008/0065666 | A1 | 3/2008 | Rose et al. |
| 2008/0134158 | A1 | 6/2008 | Salz et al. |
| 2008/0256384 | A1 | 10/2008 | Branson et al. |
| 2008/0301135 | A1 | 12/2008 | Alves et al. |
| 2009/0052341 | A1 | 2/2009 | Enqvist |
| 2009/0070765 | A1 | 3/2009 | Alves et al. |
| 2009/0100029 | A1 | 4/2009 | Jain et al. |
| 2009/0106190 | A1 | 4/2009 | Srinivasan et al. |
| 2009/0106218 | A1 | 4/2009 | Srinivasan et al. |
| 2009/0125550 | A1 | 5/2009 | Barga et al. |
| 2009/0125635 | A1 | 5/2009 | Barga et al. |
| 2009/0204551 | A1 | 8/2009 | Wang et al. |
| 2009/0228465 | A1 | 9/2009 | Krishnamurthy et al. |
| 2009/0319501 | A1 | 12/2009 | Goldstein et al. |
| 2010/0017214 | A1 | 1/2010 | Ambrosio et al. |
| 2010/0017379 | A1 | 1/2010 | Naibo et al. |
| 2010/0041391 | A1 | 2/2010 | Spivey et al. |
| 2010/0088325 | A1 | 4/2010 | Goldstein et al. |
| 2010/0121744 | A1 | 5/2010 | Belz et al. |
| 2010/0131538 | A1 | 5/2010 | Jones et al. |
| 2010/0280857 | A1 | 11/2010 | Liu et al. |
| 2010/0331146 | A1 | 12/2010 | Kil |
| 2011/0040808 | A1 | 2/2011 | Joy et al. |
| 2011/0093866 | A1 | 4/2011 | Grabs et al. |
| 2012/0084322 | A1 | 4/2012 | Goldstein et al. |

OTHER PUBLICATIONS

"Complex Event Processing Made Simple Using Esper", retrieved at <<http://www.theserverside.com/tt/articles/article.tss?I=ComplexEventProcessing>>, Apr. 2008. pp. 5.

Bry et al, "A High-Level Query Language for Events", retrieved at <<http://www.pms.ifi.lmu.de/mitarbeiter/eckert/publications/EDA-PS2006.pdf>>, 2006. pp. 8.

Wei et al, "ReCEPtor: Sensing Complex Events in Data Streams for Service-Oriented Architectures", retrieved at <<http://www.hpl.hp.com/techreports/2007/HPL-2007-176.pdf>>, Nov. 2, 2007. pp. 22.

"Oracle CEP 11gR1—official support for CQL", retrieved at <<http://adcalves.wordpress.com/2009/07/01/oracle-cep-11gr1-official-support-for-cql/>>, Jul. 1, 2009. pp. 3.

Barga et al, "Consistent Streaming Through Time: A Vision for Event Stream Processing", retrieved at <<http://www.cs.cornell.edu/~mshong/papers/cidr%2007%20cedr.pdf>>, Jan. 7-10, 2007. pp. 12.

"Explicit Server Development Model", retrieved at <<http://msdn.microsoft.com/en-us/library/ee391319(SQL.105).aspx>>, pp. 3, 2009.

"SQL Server 2008 R2—StreamInsight Technology", retrieved at <<http://www.microsoft.com/sqlserver/2008/en/us/R2-complex-event.aspx>>, pp. 2, 2009.

"Microsoft StreamInsight", retrieved at <<http://msdn.microsoft.com/en-us/library/ee362541(SQL.105,printer).aspx>>, pp. 1, 2009.

Grabs et al, "Introducing Microsoft's Platform for Complex Event Processing", May 2009. pp. 24.

Grabs et al, "Introducing Microsoft StreamInsight", Sep. 2009. pp. 27.

Jiang et al, "Anatomy of a Data Stream Management System", retrieved at <<http://ftp.informatik.rwth-aachen.de/Publications/CEUR-WS/Vol-215/paper12.pdf>>, 2004. pp. 16.

"Complex Event Processing (CEP)", retrieved at <<http://www.progress.com/psm/apama/data-streams/index.ssp>>, Mar. 9, 2007. pp. 2.

Wu et al, "High-Performance Complex Event Processing over Streams", retrieved at <<http://www.cs.umass.edu/~yanlei/publications/sase-sigmod2006.pdf>>, 2006. pp. 12.

"Event-Driven Models and Complex Event Processing", retrieved at http://www.cxo.eu.com/article/Event-driven-models-and-complex-event-processing/>>, 2009. pp. 3.

Snoeren et al, "Mesh-Based Content Routing using XML", retrieved at <<http://xml.coverpages.org/SnoerenMESH-XML.pdf>>, 2001. pp. 14.

Ravindran et al, "A Resource Management Model for Dynamic, Scalable, Dependable, Real-Time Systems", retrieved at <<http://citeseerx.ist.psu.edu/viewdoc/download?doi=10.1.1.40.5779&rep=rep1&type=ps>>, Apr. 11, 2006. pp. 6.

Johnson et al, "A Heartbeat Mechanism and its Application in Gigascope", retrieved at <<http://www.vldb.org/conf/2005/papers/p1079-johnson.pdf>>, 2005. pp. 10.

Oberoi et al, "Integrating DDS and COTS Complex-Event Processing Engines", retrieved at <<http://www.omg.org/news/meetings/workshops/RT-2007/04-5_Oberoi_etal-revised.pdf>>, Jul. 2007. pp. 42.

Srivastava et al, "Flexible Time Management in Data Stream Systems", retrieved at <<http://infolab.stanford.edu/~usriv/papers/time.pdf>>, PODS 2004 Jun. 14-16, 2004, Paris, France. pp. 11.

"Complex Event Processing Tutorial", obtained online at: http://www.eventstreamprocessing.com/CEP-tutorial.htm, Jun. 8, 2007, 2 pages.

Gyllstrom et al., "SASE: Complex Event Processing over Streams", 3rd Biennial Conference on Innovative Data Systems Research (CIDR), Jan. 2007, pp. 407-411.

U.S. Appl. No. 11/937,011, Office Action mailed Dec. 30, 2009, 19 pgs.

U.S. Appl. No. 11/937,011, Amendment filed Mar. 29, 2010, 13 pgs.

U.S. Appl. No. 11/937,011, Office Action mailed Jun. 24, 2010, 22 pgs.

U.S. Appl. No. 11/937,011, Amendment filed Aug. 24, 2010, 13 pgs.

U.S. Appl. No. 11/937,011, Advisory Action mailed Sep. 10, 2010, 3 pgs.

U.S. Appl. No. 11/937,011, Office Action mailed Nov. 29, 2010, 19 pgs.

U.S. Appl. No. 11/937,011, Amendment filed Mar. 29, 2011, 11 pgs.

U.S. Appl. No. 11/937,011, Office Action mailed Jun. 23, 2011, 22 pgs.

U.S. Appl. No. 11/937,011, Amendment filed Aug. 23, 2011, 14 pgs.

U.S. Appl. No. 11/937,011, Office Action mailed Nov. 25, 2011, 22 pgs.

U.S. Appl. No. 11/937,011, Amendment filed Feb. 27, 2012, 11 pgs.

U.S. Appl. No. 11/937,011, Office Action mailed May 25, 2012, 23 pgs.

U.S. Appl. No. 11/937,118, Office Action mailed May 28, 2010, 18 pgs.

U.S. Appl. No. 11/937,118, Amendment filed Sep. 28, 2010, 10 pgs.

U.S. Appl. No. 11/937,118, Office Action mailed Dec. 3, 2010, 15 pgs.

U.S. Appl. No. 11/937,118, Amendment filed Feb. 2, 2011, 13 pgs.

U.S. Appl. No. 11/937,118, Advisory Action mailed Feb. 15, 2011, 3 pgs.
U.S. Appl. No. 11/937,118, Office Action mailed Mar. 18, 2011, 17 pgs.
U.S. Appl. No. 11/937,118, Amendment filed Jul. 18, 2011, 16 pgs.
U.S. Appl. No. 11/937,118, Office Action mailed Oct. 14, 2011, 16 pgs.
U.S. Appl. No. 11/937,118, Amendment filed Feb. 13, 2012, 14 pgs.
U.S. Appl. No. 11/937,118, Notice of Allowance mailed Jun. 12, 2012, 8 pgs.
Raizman et al., "An Extensible Test Framework for the Microsoft StreamInsight Query Processor", Proceedings of the Third International Workshop on Testing Database Systems, Jun. 7, 2010, obtained online at: http://research.microsoft.com/pubs/132100/Testing%20StreamInsight.pdf, 6 pgs.
"Event Processing with Esper and NEsper", obtained online at: http://esper.codehaus.org, Jul. 16, 2012, 4 pgs.
Loddengaard, Alex, "FoneDoktor, A WibiData Application", Dec. 6, 2011, obtained online at: http://www.cloudera.com/blog/2011/12/fonedoktor-a-wibidata-application/, Jul. 16, 2012, 5 pgs.
Barga et al., "Coping with Variable Latency and Disorder in Distributed Event Streams", 26th IEEE International Conference on Distributed Computing Systems Workshops (ICDCSW'06), Jul. 4, 2006, 6 pgs.
Pallickara, Shrideep Bhaskaran, "A Grid Event Service", Ph.D. Thesis, Graduate School of Syracuse University, Jun. 2001, 110 pgs.
Barish et al., "Speculative Execution for Information Gathering Plans", Proceedings of the Sixth International Conference on Artificial Intelligence Planning and Scheduling, Apr. 23, 2002, 10 pgs.
Preiss et al., "On the Trade-off between Time and Space in Optimistic Parallel Discrete Event Simulation", 6th Workshop on Parallel and Distributed Simulation, vol. 24, Jan. 1992, pp. 1-10.
Smith, Michael David, "Support for Speculative Execution in High-Performance Processors", Technical Report Support for Speculative Execution in High-Performance Processors, Nov. 1992, pp. 7-89.
Barish et al., "Speculative Plan Execution for Information Gathering", Journal of Artificial Intelligence, vol. 172, Issue 4-5, Mar. 2008, pp. 1-50.
Wu et al., "High-Performance Complex Event Processing over Streams", Proceedings of the ACM SIGMOD International Conference on Management of Data, Jun. 27, 2006, pp. 407-418.
"Event Stream Intelligence with Esper and NEsper", Retrieved at <<http://esper.codehaus.org/>>, Retrieved Date: Mar. 7, 2011, 4 pages.
US Notice of Allowance mailed Oct. 5, 2012, in U.S. Appl. No. 11/937,118 (5 pages).
Babcock, et al. "Models and Issues in Data Stream Systems", Proceedings of the 21st ACM SIGMOD-SIGACT-SIGART Symposium on Principles of Database Systems (PODS '02); 2002; pp. 1-30.
Babu, et al. "StreaMon: An Adaptive Engine for Stream Query Processing"; ACM International Conference on Management of Data (SIGMOD 2004); 2004; pp. 931-932.
Chen, et al. "NiagaraCQ: A Scalable Continuous Query System for Internet Databases," Proceedings of the 2000 ACM SIGMOD International Conference on Management of Data; 2000; pp. 379-390.
Cherniack, et al. "Scalable Distributed Stream Processing," Proceedings of the 2003 CIRDR Conference; 2003; pp. 1-12.
Goldstein, J. et al. "Flying Fixed-Point: Recursive Processing in Stream Queries," VLDB '08; Aug. 24-30, 2008; Auckland, New Zealand.
Srivastava, et al. "Operator Placement for In-Network Stream Query Processing," Technical Report; 2004; pp. 10.
US Non-Final Office Action mailed Feb. 1, 2013, in U.S. Appl. No. 13/189,566 (18 pages).

TIME-BASED EVENT PROCESSING USING PUNCTUATION EVENTS

BACKGROUND

The event-based computation paradigm has grown in importance for enterprises. For example, many business applications and system control applications can be developed based on event-based computation. Generally, event processing applications receive events, analyze the events, and output results (e.g., proposed actions) based on the analysis of the events.

Some event sources produce a stream of events. When an event having an incorrect payload is produced, another event with the correct payload may be subsequently produced, effectively "overwriting" the earlier incorrect event. Because the frequency of events, and by extension the frequency of error-correcting events, may be random, event processing systems generally wait for a subsequent event before processing a prior event. By waiting for a subsequent event, the event processing system may be able to verify that it is operating on the "correct" payload. However, this waiting process may introduce undesirable latency in the event processing system.

SUMMARY

The present disclosure describes time-based event processing using punctuation events. Punctuation events having a punctuation timestamp are received by an event processing system. A punctuation event "promises" the event processing system that no subsequently received events will have a validity time period that starts earlier than the punctuation timestamp. Thus, event processing systems may determine that the payload of an event is "finalized" or "correct" when a punctuation event is received, instead of waiting for a subsequent event.

The use of punctuation events may enable event processing systems to produce multiple query results with respect to events. For example, a "preliminary" result may be produced with respect to a particular event when a subsequent punctuation event is received, because the event processing system may infer that the payload of the particular event is finalized, even though the validity time period of the particular event may not be finalized. When both the payload and the validity time period of the particular event are finalized, the event processing system may produce a "finalized" result. Because many sinks (e.g., clients) of the event processing system operate based on event payloads, and not event validity periods, the use of punctuation events may reduce undesirable latency in event processing systems (e.g., because the sinks may be able to make decisions based on the preliminary results instead of waiting for the finalized results).

This Summary is provided to introduce a selection of concepts in a simplified form that are further described in the Detailed Description. This Summary is not intended to identify key features or essential features of the claimed subject matter, nor is it intended to be used to limit the scope of the claimed subject matter.

DETAILED DESCRIPTION

Systems, methods, and computer-readable media to perform time-based event processing using punctuation events are disclosed. In a particular embodiment, a method includes receiving, at a computer system, a first event object that includes a first validity start time and a first validity end time that is initially undefined. The method includes, after receiving the first event object, receiving a punctuation event object that includes a punctuation timestamp indicating a time subsequent to the first validity start time. The punctuation event object indicates that event objects received at the computer system after the punctuation event object will have validity start times later than the time indicated by the punctuation timestamp. The method further includes setting the first validity end time to a value later than or equal to the time indicated by the punctuation timestamp.

In another particular embodiment, a system is disclosed that includes a processor and a memory communicatively coupled to the processor. The memory stores instructions, that when executed by the processor, trigger an insertion event indicating the arrival of an unfinalized event object with a valid payload. The instructions, when executed by the processor, also trigger an punctuation event represented by a punctuation event object, where the punctuation event object has a timestamp preventing later received event objects from overwriting the valid payload of the unfinalized event object. The instructions, when executed by the processor, further trigger a lifetime shrink event creating a finalized event object by setting a newly defined validity end time for the unfinalized event object.

In another particular embodiment, a computer-readable storage medium is disclosed that includes instructions, that when executed by a computer, cause the computer to receive a plurality of unfinalized event objects, where each unfinalized event object includes a validity start time and a validity end time that is initially undefined. The computer-readable medium also includes instructions, that when executed by the computer, cause the computer to generate a plurality of preliminary results with respect to the plurality of unfinalized event objects. The computer-readable medium further includes instructions, that when executed by the computer, cause the computer to receive a punctuation event including a punctuation timestamp indicating a time subsequent to the validity start times of each of the unfinalized events. The computer-readable medium includes instructions, that when executed by the computer, cause the computer to receive a post-punctuation event object including a post-punctuation validity start time subsequent to the time indicated by the punctuation timestamp. The computer-readable medium also includes instructions, that when executed by the computer, cause the computer to convert the plurality of unfinalized events to a plurality of finalized events by setting the validity end times of each of the unfinalized events to be equal to the post-punctuation validity start time. The computer-readable medium includes further instructions, that when executed by the computer, cause the computer to generate a plurality of finalized results with respect to the plurality of finalized event objects.

Figure 1:
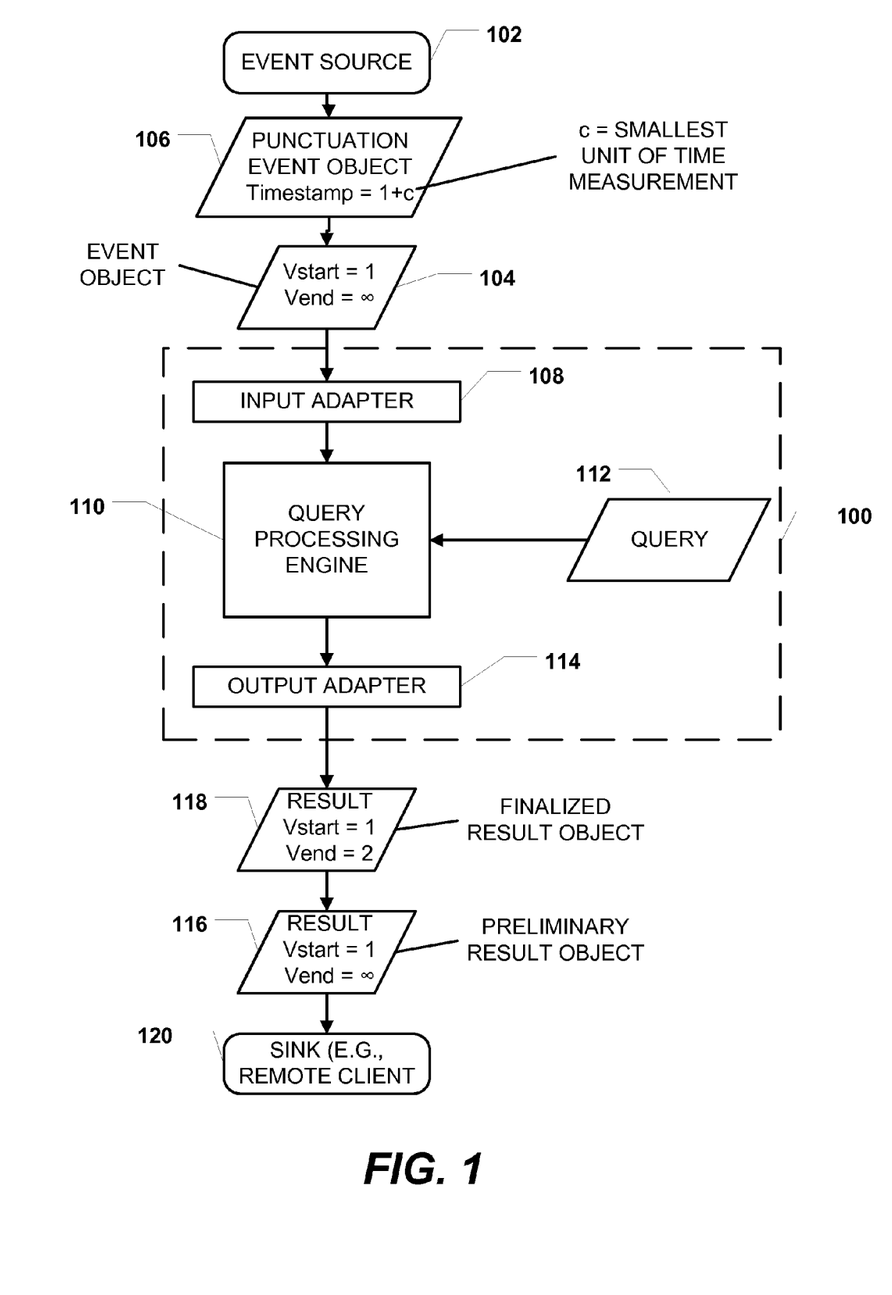
FIG. 1 is a block diagram to illustrate a particular embodiment of a system to perform time-based event processing using punctuation events.

FIG. 1 is a block diagram to illustrate a particular embodiment of a system 100 to perform time-based event processing using punctuation events (e.g., represented by an illustrative punctuation event object 106). The system 100 is communicatively coupled to a source 102 and a sink 120. Generally, a query processing engine 110 at the system may perform time-based event processing of events (e.g., as represented by an illustrative event object 104) using punctuation events.

The input adapter 108 at the system 100 is configured to receive event objects, such as the event object 104, from the source 102 and to transmit the event objects to the query processing engine 110. For example, the source 102 may include a database, a server, an event ticker, a network port, a sensor, or some other event source that provides events to the input adapter 108. Event objects transmitted to the query processing engine may include an event payload, a validity start time, and a validity end time. The validity end time may initially be undefined. For example, the event object 104 includes a validity start time of 1 (Vstart=1) and an undefined validity end time (Vend=∞).

The query processing engine 110 is configured to execute the query 112 with respect to event objects (e.g., the event object 104) to generate result objects (e.g., the result objects 116 and 118). Validity start times and validity end times may enable the query processing engine 110 to execute time-based queries (e.g., the query 112 may be a continuously executing limited latency query such as a sliding window query or a hopping window query). For example, an event may be "valid" during the time period between the event's validity start time and validity end time, and may be "invalid" during other times.

The query processing engine 110 is also configured to receive punctuation event objects, such as the punctuation event object 106. Each punctuation event object includes a punctuation timestamp. For example, the punctuation event object 106 includes a punctuation timestamp of "1+c," where 'c' represents a chronon, the smallest unit of time measurement at the computer system. In systems that process events that have validity time periods, such as the system 100 of FIG. 1, the punctuation event object 106 may serve as a clock tick and may finalize previously received events. For example, the punctuation event object 106 may indicate to the query processing engine 110 that no subsequently received events at the query processing engine 110 will have a validity start time earlier than "1+c." In a particular embodiment, the punctuation event object 106 is a current time increment (CTI) event having a CTI timestamp of "1+c."

When the query processing engine 110 receives a punctuation event object, the query processing engine 110 may finalize previously received unfinalized events. For example, the query processing engine 110 may set the initially undefined validity end time of such unfinalized events to a value later than or equal to the time indicated by the punctuation timestamp of the punctuation event object. In a particular embodiment, the query processing engine 110 waits for a second event object to be received and sets the validity end time of the unfinalized event object to the validity start time of the second event object. For example, after receiving the punctuation event object 106, the query processing engine 110 may receive a second event object with Vstart=2 from the source 102. Because Vstart=2 for the second event object, the query processing engine 110 may infer that Vend for the first event object 104 cannot be greater than 2, and may set Vend for the first event object 104 to 2.

While the validity end time of an event is undefined, a "preliminary" result (e.g., the preliminary result 116) from query execution may be generated based on the event. The result from query execution is said to be "preliminary" because it is not known how long the event, and therefore the result, will be valid. When the validity end time of an event is defined, a "finalized" result (e.g., the finalized result 118) may be generated. The result is said to be "finalized" because it is known that the validity time interval of the event, and therefore the result, will not change.

It should be noted that multiple unfinalized event objects with undefined validity end times may be finalized after receiving a single punctuation event object. For example, a second event object may be received at the system 100 after the event object 104 but prior to the punctuation event object 106, where the validity end time of the second event object is also undefined. Upon receipt of the punctuation event object 106, the query processing engine 110 may set the validity end time of the second event object to a value later than or equal to "1+c." It should also be noted that a frequency of occurrence of punctuation event objects at the system 100 may be user-defined or system-controlled.

The output adapter 114 at the system 100 is configured to transmit result objects, such as the result objects 116 and 118, to the sink 120. For example, the sink 120 may be a remote client of the system 100 that includes a communications device, a mobile device, a computer system, a database, a server, an event store, or some other consumer of result objects produced by the system 100. Result objects transmitted to the sink 120 may include a result payload, a validity start time, and a validity end time. The validity end time may be undefined for preliminary result objects (e.g., Vend=∞ for the preliminary result object 116) and may be defined for finalized result objects (e.g., Vend=2 for the finalized result object 118).

In operation, the input adapter 108 may receive the event object 104 from the source 102, where the event object 104 has a validity start time Vstart=1 and a validity end time Vend=∞. The query processing engine 110 may execute the query 112 with respect to the event object 104 to generate the preliminary result object 116. The preliminary result object 116 may indicate the validity start time (e.g., Vstart=1) and the validity end time (e.g., Vend=∞) of the event object 104. The output adapter 114 may transmit the preliminary result object 116 to the sink 120.

Subsequent to receiving the event object 104, the input adapter 108 may receive the punctuation event object 106 with the punctuation timestamp "1+c." Upon receiving the punctuation event object 106, the query processing engine 110 may determine that the validity end time of event object may not be earlier than "1+c." For example, the query processing engine 110 may set the validity end time of the event object 104 to Vend=2 (e.g., when a subsequent event object having Vstart=2 is received). A finalized result object 118 may be generated by the event processing engine 110 and may be transmitted to the sink 120 by the output adapter 114.

It should be noted that although the particular embodiment illustrated in FIG. 1 depicts the punctuation event object 106 originating from the source 102, the punctuation event object 106 may instead originate from within the system 100 (e.g., from the input adapter 108) or from some other hardware clock event (e.g., a processor) or software clock event source inside or outside the system 100 of FIG. 1. It should also be noted that although the particular embodiment illustrated in FIG. 1 depicts that the source 102 and the sink 120 are remote from the system 100, one or more of the source 102 and the sink 120 may instead be local to the system 100. For example, the source 102 may be a locally stored event history at the system 100.

It will be appreciated that the system 100 of FIG. 1 may enable time-based processing of events using punctuation events. The system 100 of FIG. 1 may reduce query processing latency. For example, the sink 120 may be able to make conclusions regarding the event object 104 based on the preliminary result object 116, without waiting for the subsequently produced finalized result object 118.

Figure 2:
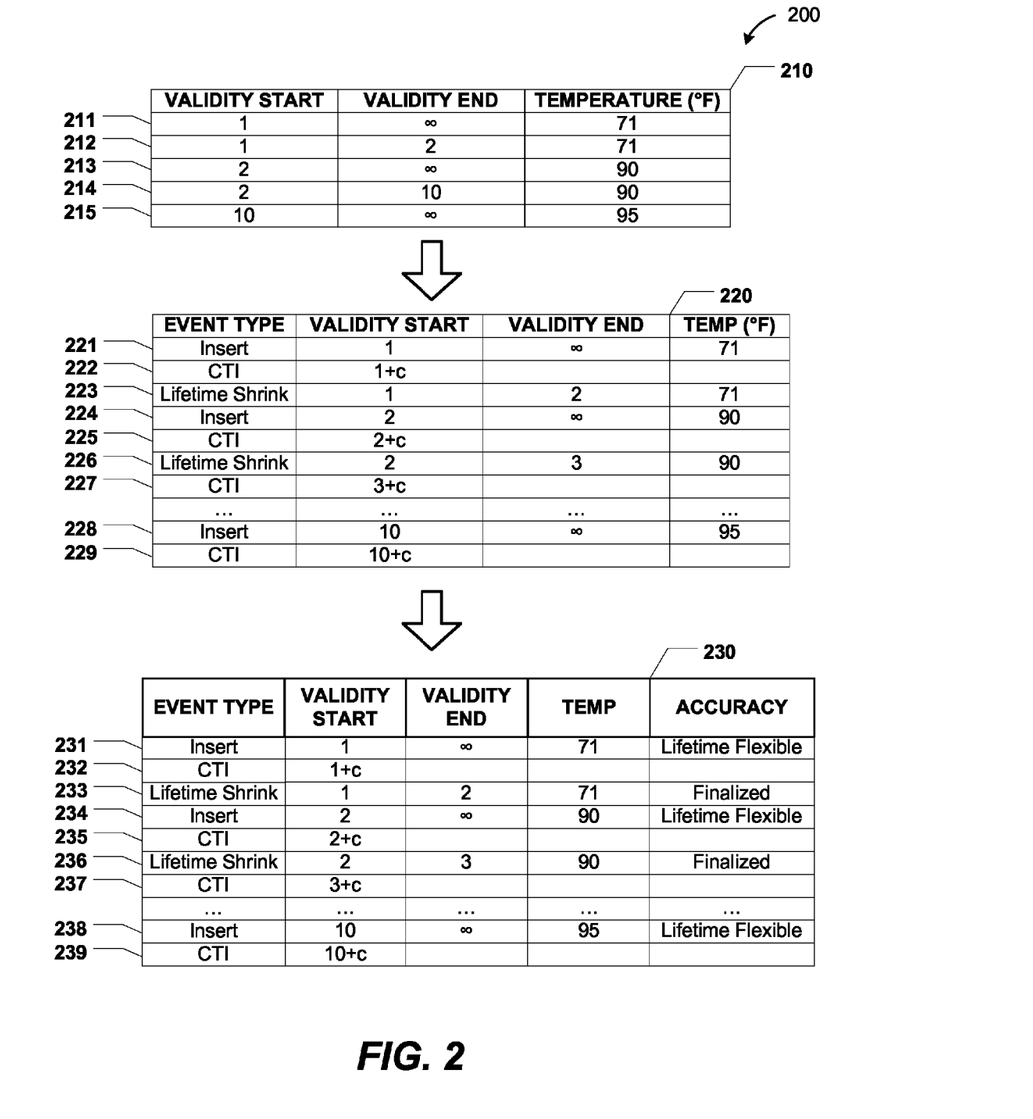
FIG. 2 is a general diagram including tables illustrating time-based event processing using punctuation events.

FIG. 2 is a general diagram 200 including tables 210, 220, and 230 to illustrate time-based event processing using punctuation events. Consider an event processing system that receives temperature readings in the form of event objects from a source, where the source transmits a new event object when the temperature changes but does not transmit a new event object if the temperature has not changed since transmission of a previous event object. The event processing system measures time in seconds. The event processing system transmits result objects to a sink, where the result objects indicate whether the temperature readings contained in the event objects are within operational bounds. For example, the sink may activate an alarm or cooling mechanism if a result object indicates that the temperature reading is greater than 80° F. or less than 60° F.

Table 210 illustrates a sequence of operations at the event processing system when no punctuation event objects (e.g., CTI event objects) are used. When no punctuation event objects are used at an event processing system, the event processing system may produce finalized results, but not preliminary results. Initially, a first event object having a validity start time of 1 and a validity end time of ∞ is received, at 211. The first event object includes a temperature reading of 71° F. Next, the validity end time of the first event object is set to 2, at 212, because a second event object having a validity start time of 2, a validity end time of ∞, and a temperature reading of 90° F. has been received, at 213. When the second event object is received, the event processing system may determine that because the temperature has changed (e.g., from 71° F. to 90° F.), the validity of the 71° temperature reading ended at the validity start time of the 90° temperature reading. When the validity end time of the first event object is set to 2, the first event object becomes finalized and the event processing system transmits a result object indicating that conditions are within bounds. However, the second event indicates that the temperature has risen from 71° F. to 90° F., which is out of the upper operational bounds of 80° F. The event processing system may not transmit a result object indicating the out-of-bounds condition because the second event object is not yet finalized (i.e., the second event object has an undefined validity end time).

Eight seconds later, the validity end time of the second event object is set to 10, at 214, because a third event object having a validity start time of 10, a validity end time of ∞, and a temperature reading of 95° F. has been received, at 215. When the validity end time of the second object is set to 10, the second event object becomes finalized and the event processing system transmits a second result object indicating that conditions are out-of-bounds. It will be appreciated that due to the lack of punctuation event objects and without the ability to generate preliminary results, the event processing system did not communicate the out-of-bounds condition until 8 seconds had elapsed.

Table 220 illustrates a sequence of operations at an event processing system that implements punctuation event objects as described with reference to the punctuation event object 106 of FIG. 1. Thus, the event processing system may produce both preliminary results as well as finalized results. In the particular embodiment illustrated by Table 220, each operation is represented as an event. For example, receiving a new event object is represented by an "Insert" event type, receiving a punctuation event object is represented by a "CTI" event type, and finalizing an event object is represented by a "Lifetime Shrink" event type.

Initially, an insert event 221 may occur, indicating the arrival of a first event object having a validity start time of 1, a validity end time of ∞, and a temperature reading of 71° F. A first CTI event 222 may then occur, where the first CTI event 222 is represented by a CTI event object having a timestamp "1+c." Because the CTI event 222 has a timestamp of "1+c," the event processing system may infer that no subsequently received event objects will have a validity start time earlier than "1+c." That is, no subsequently received event objects may "overwrite" the fact that the temperature was 71° when the first event object was transmitted. Therefore, based on the first CTI event 222, the event processing system may treat the 71° F. temperature reading reported by the first event object as finalized. That is, the event processing system may treat the payload of the first event object as finalized, even though the validity end time for the first event object is still undefined, and the event processing system generates a first preliminary result indicating the finalized temperature reading of 71° F. It will thus be appreciated that a preliminary result may indicate a finalized payload while also having an unfinalized validity time period.

Next, the event processing system may trigger the occurrence of a first lifetime shrink event 223, where the validity end time of the first event object is set from ∞ to a value later than or equal to "1+c." For example, the validity end time of the first event object may be set to 2 when a second event object with a temperature reading of 90° F. is received after the first CTI event 222. An insert event 224 is associated with the arrival of the second event object. Upon occurrence of the lifetime shrink event 223, the event processing system may generate a finalized result with respect to the first event object, indicating that the temperature remained at 71° for one second (e.g., between the validity start time 1 and the validity end time 2). It will thus be appreciated that a finalized result may indicate both a finalized payload as well as a finalized validity time period.

The second event object has a validity end time of ∞ and an out-of-bounds temperature reading of 90° F. When a second CTI event 225 represented by a CTI event object having a timestamp "2+c" is received, the event processing system may treat the 90° F. temperature reading as finalized, and may generate a second preliminary result with respect to the second event object, indicating that temperature conditions are currently out-of-bounds but it is unknown how long the temperature will remain at 90° F. It will thus be appreciated that the sink may be informed of the out-of-bounds condition even when the event object containing the out-of-bounds temperature reading has an undefined validity time period.

A second lifetime shrink event 226 for the second event object, a third CTI event 227, a third insert event 228, and a fourth CTI event 229 may be processed in a similar fashion by the event processing system.

In a particular embodiment, an event processing system implementing time-based processing using punctuation event objects may provide an indication of the accuracy of each result object. For example, the event processing system may indicate that preliminary results are associated with "lifetime flexible" events (e.g., events having an event payload that cannot change but a validity end time that can change) and that finalized results are associated with "finalized" events (e.g., events that have unchangeable event payloads and unchangeable validity end times).

Table 230 illustrates a sequence of operations at the event processing system when the event processing system implements punctuation event objects as described with reference to the punctuation event object 106 of FIG. 1 and indicates an accuracy of result objects. The events of the table 230 may be processed in a similar fashion to the events of the table 220. For example, the first insert event 231, the first CTI event 232, the first lifetime shrink event 233, the second insert event 234, the second CTI event 235, the second lifetime shrink event 236, the third CTI event 237, the third insert event 238, and the fourth CTI event 239 of the table 230 may be processed as described with reference to the first insert event 221, the first CTI event 222, the first lifetime shrink event 223, the second insert event 224, the second CTI event 225, the second lifetime shrink event 226, the third CTI event 227, the third insert event 228, and the fourth CTI event 229 of the table 220.

Each result object produced by the event processing system may indicate an accuracy of the result object. For example, the first preliminary result object produced after occurrence of the first CTI event 232 and the second preliminary result object produced after occurrence of the second CTI event 235 may each indicate that they are based on lifetime flexible event objects. Similarly, the first finalized result object produced after the first lifetime shrink event 233 may indicate that it is based on a finalized event object.

It will thus be appreciated that event processing systems that use punctuation events (e.g., CTI events) may operate with reduced latency as compared to event processing systems that do not use punctuation events. For example, the use of CTI events (e.g., as illustrated by the tables 220 and 230) may result in notifying the sink of the out-of-bounds temperature condition 8 seconds earlier than if no CTI events were used (e.g., as illustrated by the table 210). It will also be appreciated that the use of result accuracy indicators, as illustrated in table 230, may enable the use of multiple sinks with a single event processing system when the sinks have different accuracy requirements. For example, in the example above, the temperature monitoring sink has a relatively low accuracy requirement (e.g., the query that determines whether the temperature reading is out-of bounds is a limited latency query) and preferentially generates an alarm or initiates a cooling mechanism based on lifetime flexible events. If an event history database was also a sink of the event processing system, the event history database may create new records based on finalized events but not lifetime flexible events, to reduce a total number of write operations at the event history database.

Figure 3:
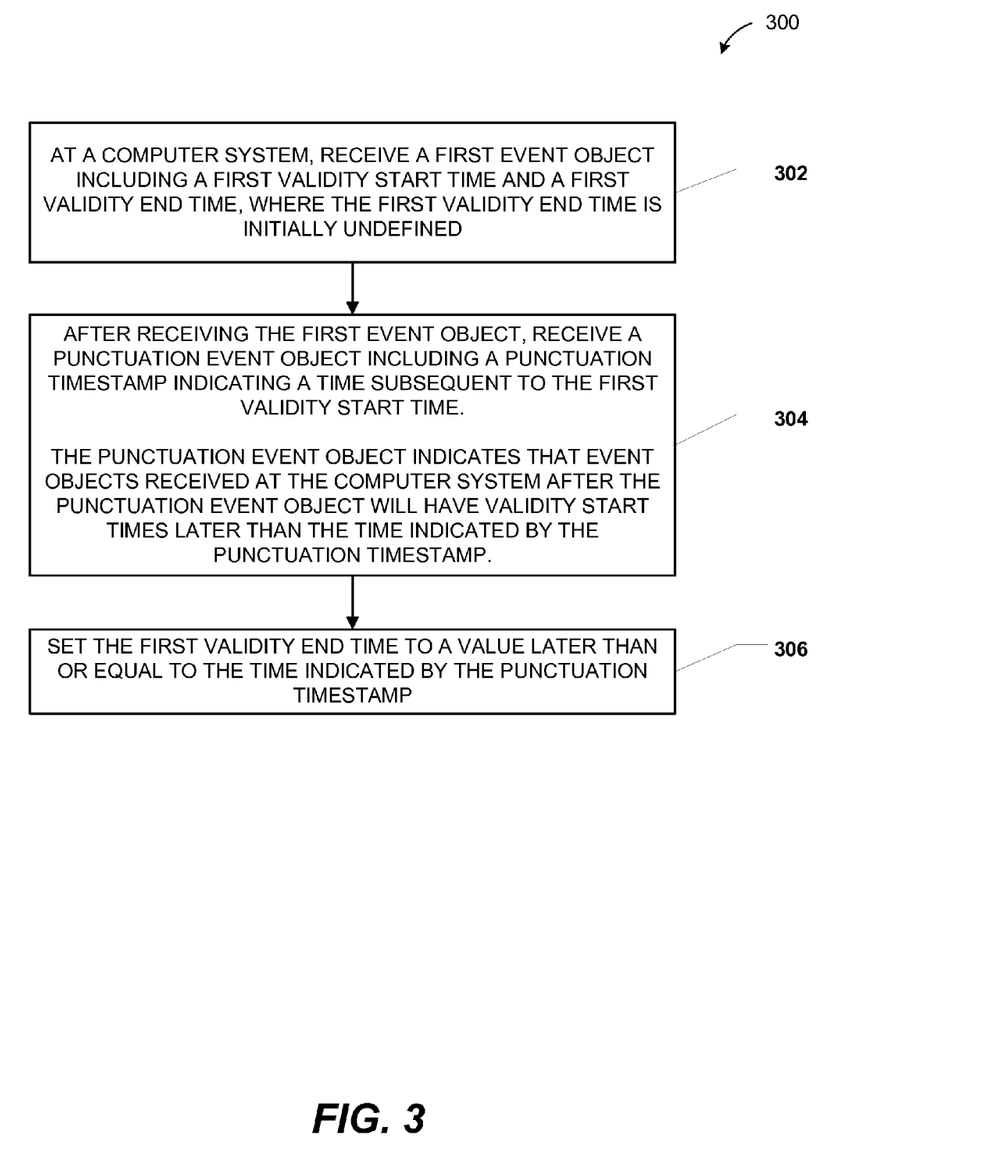
FIG. 3 is flow diagram to illustrate a particular embodiment of a method of time-based event processing using punctuation events.

FIG. 3 is flow diagram to illustrate a particular embodiment of a method 300 of time-based event processing using punctuation events. In an illustrative embodiment, the method 300 may be performed by the system 100 of FIG. 1.

The method 300 includes receiving, at a computer system, a first event object that includes a first validity start time and a first validity end time that is initially undefined, at 302. For example, in FIG. 1, the system 100 may receive the event object 104, where the validity start time and the validity end time of the event object 104 are 1 and ∞, respectively. In an illustrative embodiment, the event object 104 of FIG. 1 is the first event object associated with the first insert event 231 of FIG. 2.

The method 300 also includes, after receiving the first event object, receiving a punctuation event object including a punctuation timestamp indicating a time subsequent to the first validity start time, at 304. The punctuation event object indicates that event objects received at the computer system after the punctuation event object will have validity start times later than the time indicated by the punctuation timestamp. For example, in FIG. 1, the system 100 may receive the punctuation event object 106 that has a punctuation timestamp of "1+c." In an illustrative embodiment, the punctuation event object 106 of FIG. 1 is the CTI event object associated with the first CTI event 232 and having a timestamp of "1+c."

The method 300 further includes setting the first validity end time to a value later than or equal to the time indicated by the punctuation timestamp, at 306. For example, referring to FIG. 1, the validity end time of the event object 104 may be set to a value later than or equal to "1+c" (e.g., 2). In an illustrative embodiment, the validity start time is set via the lifetime shrink event 233 of FIG. 2.

Figure 4:
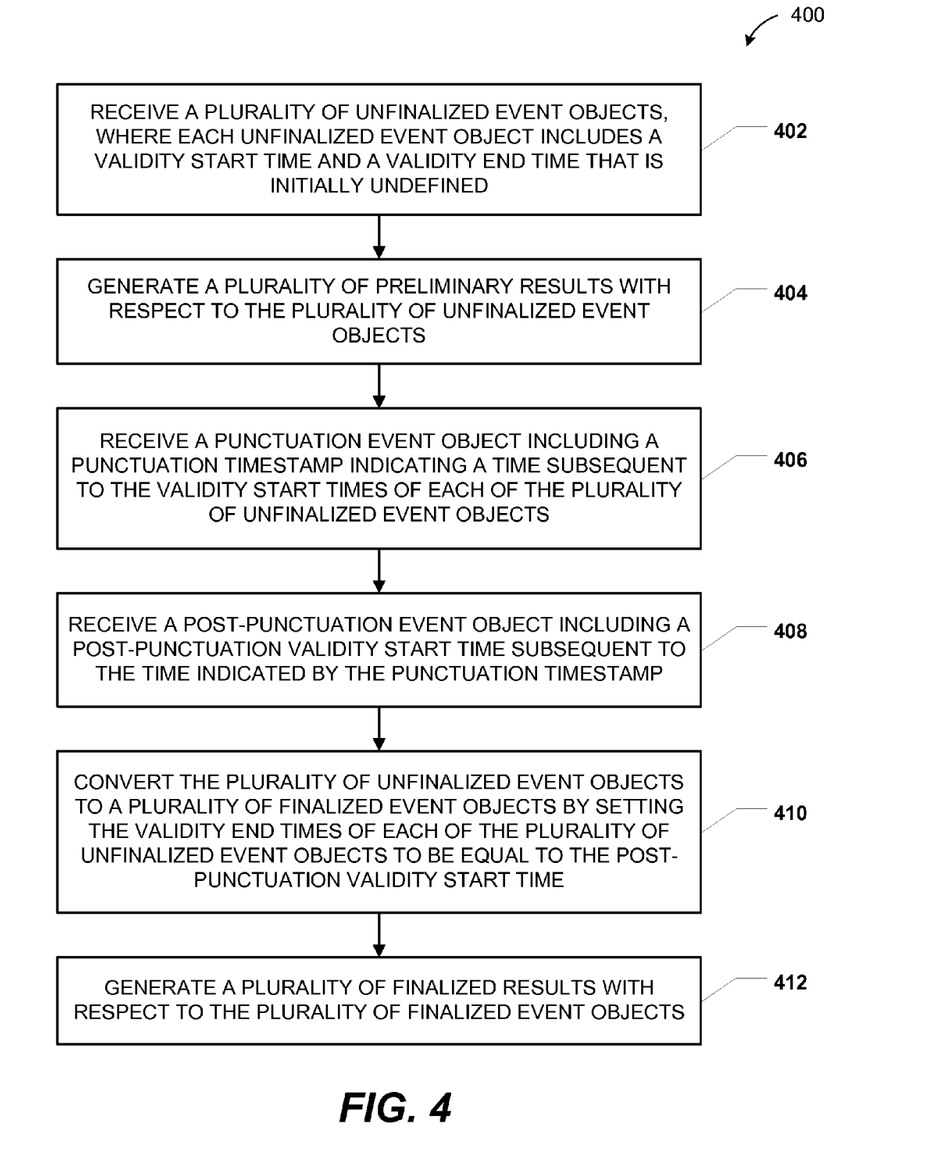
FIG. 4 is a flow diagram to illustrate another particular embodiment of a method of time-based event processing using punctuation events.

FIG. 4 is a flow diagram to illustrate another particular embodiment of a method 400 of time-based event processing using punctuation events. In an illustrative embodiment, the method 400 may be performed by the system 100 of FIG. 1.

The method 400 includes receiving a plurality of unfinalized event objects, where each unfinalized event object includes a validity start time and a validity end time that is initially undefined, at 402. For example, in FIG. 1, the system 100 may receive a plurality of unfinalized event objects (e.g., including the event object 104 having the validity start time of 1), where each unfinalized event object has a validity end time that is undefined (e.g., ∞). In an illustrative embodiment, each unfinalized event object is associated with an insert event as described with reference to FIG. 2.

The method 400 also includes generating a plurality of preliminary results with respect to the plurality of unfinalized event objects, at 404. For example, in FIG. 1, a plurality of preliminary results (e.g., represented by preliminary result objects such as the preliminary result object 116) may be generated.

The method 400 further includes receiving a punctuation event object including a punctuation timestamp indicating a time subsequent to the validity start times of each of the plurality of unfinalized event objects, at 406. For example, in FIG. 1, the punctuation event object 106 may be received. In an illustrative embodiment, the punctuation event object is associated with a CTI event as described with reference to FIG. 2.

The method 400 includes receiving a post-punctuation event object including a post-punctuation validity start time subsequent to the time indicated by the punctuation timestamp, at 408. For example, in FIG. 1, an event object having a validity start time of 2 may be received, where the time of 2 is subsequent to the time indicated by the timestamp "1+c."

The method 400 also includes converting the plurality of unfinalized event objects to a plurality of finalized event objects by setting the validity end times of each of the unfinalized event objects to be equal to the post-punctuation validity start time, at 410. For example, in FIG. 1, the validity end times of the unfinalized event objects may be set from ∞ to 2. In an illustrative embodiment, the validity end times of the unfinalized event objects are set via lifetime shrink events as described with reference to FIG. 2.

The method 400 further includes generating a plurality of finalized results with respect to the plurality of finalized event objects, at 412. For example, in FIG. 1 a plurality of finalized results (e.g., represented by finalized result objects such as the finalized result object 118) may be generated.

Figure 5:
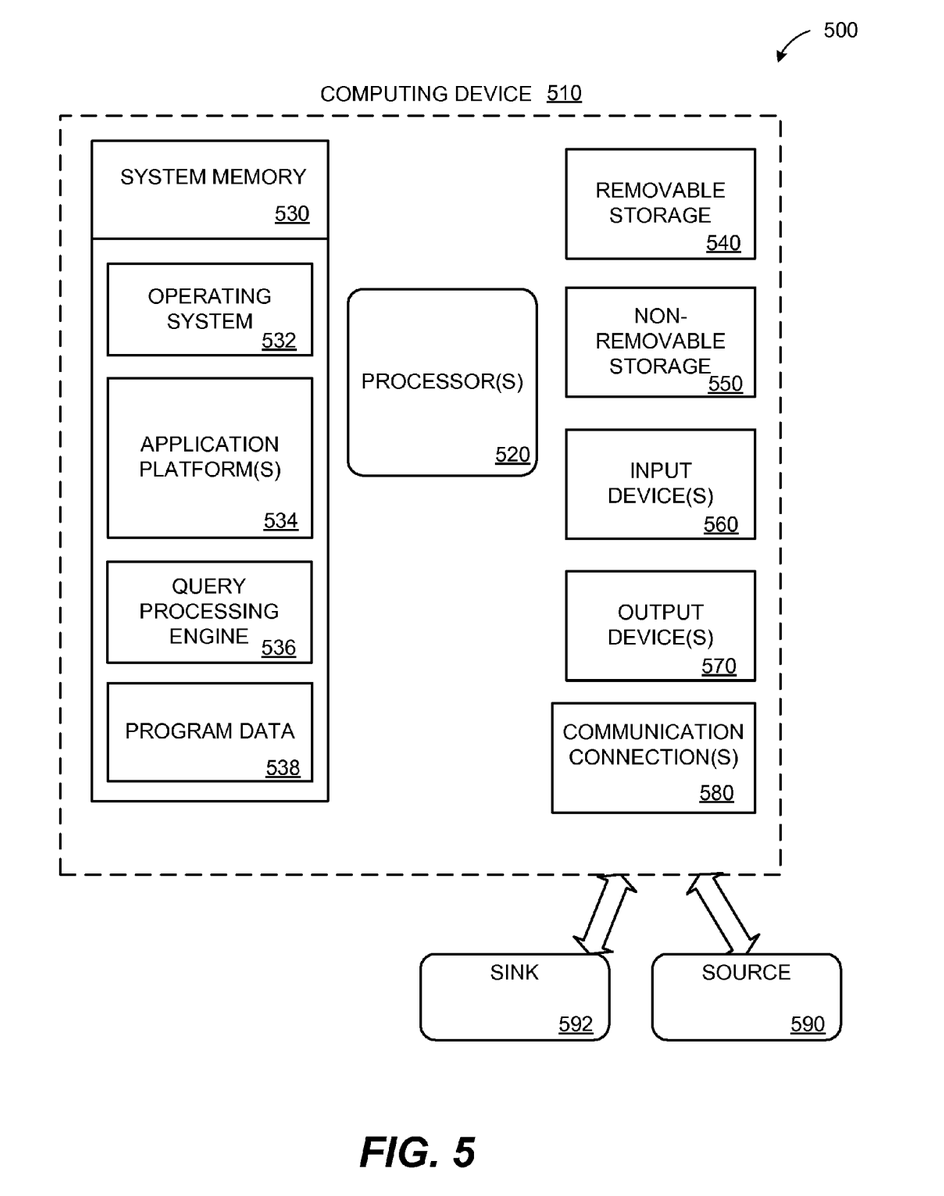
FIG. 5 is a block diagram of a computing environment including a computing device operable to support embodiments of computer-implemented methods, computer program products, and system components as illustrated in FIGS. 1-4.

FIG. 5 depicts a block diagram of a computing environment 500 including a computing device 510 operable to support embodiments of computer-implemented methods, computer program products, and system components according to the present disclosure. In an illustrative embodiment, the computing device 510 may include one or more of the input adapter 108, the output adapter 114, and the query processing engine 110 of FIG. 1. Each of the input adapter 108, the output adapter 114, and the query processing engine 110 of FIG. 1 may include or be implemented using the computing device 510 or a portion thereof.

The computing device 510 includes at least one processor 520 and a system memory 530. Depending on the configuration and type of computing device, the system memory 530 may be volatile (such as random access memory or "RAM"), non-volatile (such as read-only memory or "ROM," flash memory, and similar memory devices that maintain stored data even when power is not provided), or some combination of the two. The system memory 530 typically includes an operating system 532, one or more application platforms 534, one or more applications (e.g., a query processing engine 536), and may include program data 538 associated with one or more applications. In an illustrative embodiment, the query processing engine 536 is the query processing engine 110 of FIG. 1.

The computing device 510 may also have additional features or functionality. For example, the computing device 510 may also include removable and/or non-removable additional data storage devices such as magnetic disks, optical disks, tape, and standard-sized or miniature flash memory cards. Such additional storage is illustrated in FIG. 5 by removable storage 540 and non-removable storage 550. Computer storage media may include volatile and/or non-volatile storage and removable and/or non-removable media implemented in any method or technology for storage of information such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 510. Any such computer storage media may be part of the computing device 510 or may be external to the computing device 510. The computing device 510 may also have input device(s) 560, such as a keyboard, mouse, pen, voice input device, touch input device, etc. Output device(s) 570, such as a display, speakers, printer, etc. may also be included.

The computing device 510 also contains one or more communication connections 580 that allow the computing device 510 to communicate with other computing devices over a wired or a wireless network. In an illustrative embodiment, the communication connections 580 include the input adapter 108 and the output adapter 114 of FIG. 1. For example, the computing device may communicate with a source 590 and a sink 592 via the communication connections 580. In an illustrative embodiment, the source 590 is the source 102 of FIG. 1. In another illustrative embodiment, the sink 592 is the sink 120 of FIG. 1. It should be noted that the source 590 and the sink 592 may communicate with the computing device 510 via mechanisms other than the communication connections. For example, the source 590 and the sink 592 may be local to the computing device 510 and stored at the removable storage 540 or the non-removable storage 550 (e.g., as local event stores or event histories).

It will be appreciated that not all of the components or devices illustrated in FIG. 5 or otherwise described in the previous paragraphs are necessary to support embodiments as herein described. For example, the input device(s) 560 and the output device(s) 570 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
   at a computer system, receiving a first event object comprising a first validity start time and a first validity end time, wherein the first validity end time is initially undefined or unfinalized;
   after receiving the first event object, receiving a punctuation event object comprising a punctuation timestamp indicating a time subsequent to the first validity start time, wherein the punctuation event object indicates that event objects received at the computer system after the punctuation event object will have validity start times later than the time indicated by the punctuation timestamp; and
   setting the first validity end time to a value later than or equal to the time indicated by the punctuation timestamp.

2. The method of claim 1, wherein the time indicated by the punctuation timestamp is greater than the first validity start time by at least a smallest unit of time measurement at the computer system.

3. The method of claim 1, wherein the punctuation event is a current time increment (CTI) event.

4. The method of claim 1, further comprising receiving a second event object comprising a second validity start time and a second validity end time.

5. The method of claim 4, wherein when the time indicated by the punctuation timestamp is subsequent to the second validity start time, the method further comprises setting the second validity end time to the value later than or equal to the time indicated by the punctuation timestamp.

6. The method of claim 5, wherein when the second validity start time is subsequent to the time indicated by the punctuation timestamp, the method further comprises:
   after receiving the second event object, receiving a second punctuation event object comprising a second punctuation timestamp indicating a time subsequent to the second validity start time, wherein the second punctuation event object indicates that event objects to be received at the computer system after the second punctuation event object have validity start times later than the time indicated by the second punctuation timestamp; and
   setting the second validity end time to a second value later than or equal to the time indicated by the second punctuation timestamp.

7. The method of claim 6, wherein the first event object further comprises a payload.

8. The method of claim 1, further comprising, prior to receiving the punctuation event object:
   executing a query to generate a preliminary query result; and
   transmitting the preliminary query result to a client of the computer system.

9. The method of claim 8, wherein the client is remote from the computer system.

10. The method of claim 8, wherein the first event object is classified as a finalized event object after the first validity end time of the first event object is set.

11. The method of claim 8, further comprising, after setting the first validity end time:
    executing the query to generate a finalized result; and
    transmitting the finalized result to the client of the computer system.

12. A system, comprising:
    a processor; and
    a memory, communicatively coupled to the processor, storing instructions that, when executed by the processor, trigger:
        an insertion event indicating the arrival of an unfinalized event object with a valid payload;
        a punctuation event represented by a punctuation event object, wherein the punctuation event object has a timestamp preventing later received event objects from overwriting the valid payload of the unfinalized event object;
        a lifetime shrink event creating a finalized object by setting a newly defined validity end time for the unfinalized event object to a value later than or equal to the time indicated by the punctuation timestamp.

13. The system of claim 12, wherein a continuously executing query at a query engine of the system generates a preliminary result based on the unfinalized event object and a finalized result based on the finalized event object.

14. The system of claim 13, wherein the query is a sliding window query, a hopping window query, or any combination thereof 15. The system of claim 13, wherein the query is a limited latency query.

16. The system of claim 12, wherein the punctuation event object is generated based on a hardware clock of a processor at the system.

17. The system of claim 12, wherein the punctuation event object is generated based on a software clock at the system.

18. A computer-readable storage medium comprising instructions, that when executed by a computer, cause the computer to:
    receive a plurality of unfinalized event objects, wherein each unfinalized event object comprises a validity start time and a validity end time that is initially undefined or unfinalized;
    generate a plurality of preliminary results with respect to the plurality of unfinalized event objects;
    receive a punctuation event object comprising a punctuation timestamp indicating a time subsequent to the validity start times of each of the plurality of unfinalized event objects;
    receive a post-punctuation event object comprising a post-punctuation validity start time subsequent to the time indicated by the punctuation timestamp;
    convert the plurality of unfinalized event objects to a plurality of finalized event objects by setting the validity end times of each of the plurality of unfinalized event objects to be equal to the post-punctuation validity start time; and
    generate a plurality of finalized results with respect to the plurality of finalized event objects.

19. The computer-readable storage medium of claim 18, wherein the plurality of preliminary results are transmitted to a client.

20. The computer-readable storage medium of claim 19, wherein the plurality of finalized results are transmitted to the client after the transmission of the plurality of preliminary results.

* * * * *